United States Patent
Napier et al.

(10) Patent No.: US 10,012,475 B2
(45) Date of Patent: Jul. 3, 2018

(54) SYSTEMS AND METHODS FOR AUTOMATED COACHING OF A SHOOTER

(71) Applicant: Meggitt Training Systems Inc., Suwanee, GA (US)

(72) Inventors: James Napier, Buford, GA (US); Edric Rominger, Atlanta, GA (US); Darren Shavers, Newnan, GA (US); Allen Priest, Suwanee, GA (US)

(73) Assignee: MEGGITT TRAINING SYSTEMS, INC., Suwanee, GA (US)

( * ) Notice: Subject to any disclaimer, the term of this patent is extended or adjusted under 35 U.S.C. 154(b) by 266 days.

(21) Appl. No.: 14/660,663

(22) Filed: Mar. 17, 2015

(65) Prior Publication Data

US 2015/0285592 A1 Oct. 8, 2015

Related U.S. Application Data

(60) Provisional application No. 61/954,493, filed on Mar. 17, 2014.

(51) Int. Cl.
*F41G 3/26* (2006.01)
*F41G 3/00* (2006.01)
*G09B 19/00* (2006.01)

(52) U.S. Cl.
CPC .......... *F41G 3/26* (2013.01); *F41G 3/00* (2013.01); *G09B 19/00* (2013.01)

(58) Field of Classification Search
CPC .............. F41G 3/00; F41G 3/26; G09B 19/00
USPC ........................................................ 434/19
See application file for complete search history.

(56) References Cited

U.S. PATENT DOCUMENTS

| 4,804,325 | A | 2/1989 | Willitis et al. | |
|---|---|---|---|---|
| 4,923,402 | A | 5/1990 | Marshall et al. | |
| 6,257,893 | B1* | 7/2001 | Trabut | F41A 33/00 434/11 |
| 6,699,041 | B1* | 3/2004 | Larkin | F41J 1/00 434/16 |
| 6,739,873 | B1* | 5/2004 | Rod | F41G 3/165 434/16 |

(Continued)

OTHER PUBLICATIONS

Temby, Philip; Stephens, Ashley; Development and Evaluation of a Novel Method for Basic Marksmanship Training on an Australian Army Couse; Feb. 2014; Defence Science and Technology Organisation; pp. 15-17; http://www.dtic.mil/dtic/tr/fulltext/u2/a615295.pdf.*

(Continued)

*Primary Examiner* — Sam Yao
*Assistant Examiner* — Joshua Luo
(74) *Attorney, Agent, or Firm* — Hackler Daghighian Martino & Novak (57) ABSTRACT

A method for automatically predicting the cause of suboptimal shooting is provided. In some embodiments, the method comprises: providing a plurality of good example reference data to an evaluation function; providing a plurality of bad example reference data to the evaluation function; obtaining training data of a trainee's shot dispersion data; obtaining training data from at least one sensor mounted on the trainee's gun; using the evaluation function to classify the training data as good or bad; and, displaying the classification on a screen as feedback.

20 Claims, 6 Drawing Sheets

(56) References Cited

U.S. PATENT DOCUMENTS

| | | | | |
|---|---|---|---|---|
| 9,022,785 | B2* | 5/2015 | Dribben | F41G 3/26 434/19 |
| 9,151,564 | B1* | 10/2015 | Baxter | F41A 33/00 |
| 2002/0197584 | A1 | 12/2002 | Kendir et al. | |
| 2010/0010792 | A1 | 1/2010 | Blevins et al. | |
| 2010/0273130 | A1 | 10/2010 | Chai et al. | |
| 2012/0115110 | A1* | 5/2012 | Wade | F41G 3/26 434/19 |
| 2012/0270186 | A1* | 10/2012 | Singh | F41A 33/00 434/19 |
| 2013/0043130 | A1 | 2/2013 | Lednev et al. | |
| 2013/0203019 | A1* | 8/2013 | Nolen | F41G 3/26 434/16 |
| 2013/0244211 | A1 | 9/2013 | Dowling et al. | |
| 2014/0038136 | A1* | 2/2014 | Hamilton | F41G 3/26 434/19 |
| 2015/0023591 | A1* | 1/2015 | Potluri | F41J 5/10 382/162 |
| 2015/0141100 | A1* | 5/2015 | Carter | A63F 9/0291 463/2 |
| 2015/0253109 | A1* | 9/2015 | Wichner | F41A 17/12 434/19 |
| 2016/0298930 | A1* | 10/2016 | Squire | F41G 3/2694 |

OTHER PUBLICATIONS

Welling, Max; Fisher Linear Discriminant Analysis; May 15, 2005; University of Toronto, Department of Computer Science; pp. 3-4; http://www.ics.uci.edu/~welling/classnotes/papers_class/Fisher-LDA.pdf.*

A Basic Introduction to Neural Networks; Aug. 15, 2007; University of Wisconsin; http://pages.cs.wisc.edu/~bolo/shipyard/neural/local.html.*

International Search Report and Written Opinion for International Application No. PCT/US15/21086, dated Jun. 17, 2015.

* cited by examiner

SYSTEMS AND METHODS FOR AUTOMATED COACHING OF A SHOOTER

RELATED APPLICATIONS

This application claims the benefit of U.S. Provisional Patent Application No. 61/954,493, filed Mar. 17, 2014, and titled "SYSTEMS AND METHODS FOR AUTOMATED COACHING OF A SHOOTER," which is incorporated herein in its entirety by reference.

FIELD

In the present patent document, systems and methods for automated coaching of a shooter are provided. In particular, systems and methods for acquiring target data and sensor data and predicting a shooter's mistakes by analysis of the data are provided.

BACKGROUND

Currently, on many live fire and virtual fire ranges, the instructor must pay close attention to each trainee in order to identify whether the trainee is making fundamental shooting errors. Typically, firearms instructors focus on addressing the four fundamentals of marksmanship: 1) establishing a steady body position in order to observe the target, 2) aiming the weapon correctly and consistently to align the sights with the target, 3) controlling breathing during firing of the weapon, and 4) properly squeezing the trigger. The instructor analyzes these aspects of a shooter to determine whether proper techniques are being applied. For example, the instructor may be trying to detect if a shooters poor performance is due to improper breathing, body position, canting the weapon, improper trigger squeeze, suboptimal point of aim, unsteady position or some combination thereof. This can prove difficult given the high numbers of trainees using the system simultaneously, and is even more difficult on a live range where many of diagnostic sensors are not instrumented on the weapon. To this end, it would be desirable to have a system and method to allow a shooter to provide more consistent and frequent feedback about what mistakes he or she may be making that results in a suboptimal shot.

SUMMARY OF THE EMBODIMENTS

In view of the foregoing, an object according to one aspect of the present patent document is to provide systems and methods for automated coaching of a shooter. Preferably, the methods and systems address, or at least ameliorate, one or more of the problems described above. To this end, a method for coaching a shooter is provided. In some embodiments the method comprises: providing a plurality of good example reference data to an evaluation function; providing a plurality of bad example reference data to the evaluation function; obtaining training data of a trainee's shot dispersion data; obtaining training data from at least one sensor mounted on the trainee's weapon; using the evaluation function to classify the training data as good or bad; and, displaying feedback on a screen based on the classification.

In some embodiments, the evaluation function is a regression algorithm. However, in other embodiments the evaluation algorithm may use other techniques including pattern matching and the like.

Although many different kinds of sensors may be used, in a preferred embodiment, the shot dispersion data is obtained by a camera. In other systems other methods may be used to obtain shot data including acoustic analysis. Once the shot data is obtained, it is preferably analyzed using image analysis.

The sensors may also be used to measure or track any important quantity. In a preferred embodiment, the sensor measures any one of the group consisting of trigger squeeze pressure or displacement, weapon cant, butt pressure, aim trace, trigger break (the moment the trigger breaks typically causing the weapon's hammer to fall, initiating the shot), aim trace relative to the ideal aim-point on the target, shooter pose (e.g. standing, kneeling, prone), shot group size, and shot group mean point of impact relative to ideal impact.

In preferred embodiments, a predicted cause from a plurality of trainees is displayed on a single screen. This may be the screen of an instructor, trainee, or both. In some embodiments, select information is provided to the instructor while other information is provided to the trainee. This may be an appropriate subset of the information shown to the instructor.

In another aspect of the present patent document, a system for automatically predicting the cause of suboptimal shooting is provided. In some embodiments, the system comprises: a database with a plurality of reference records for suboptimal shooting problems; a weapon including a plurality of sensors; a computer with software that when executed by a processor performs the following steps: receive trainee data from the plurality of sensors; query the database for reference data; determine a match between the reference data and trainee data; and, displaying on a screen a predicted cause of the suboptimal shooting.

As described more fully below, systems, apparatuses and methods for automatically coaching a shooter are provided Further aspects, objects, desirable features, and advantages of the systems, apparatuses and methods disclosed herein will be better understood from the detailed description and drawings that follow in which various embodiments are illustrated by way of example. It is to be expressly understood, however, that the drawings are for the purpose of illustration only and are not intended as a definition of the limits of the claimed embodiments.

DETAILED DESCRIPTION OF THE EMBODIMENTS

The following detailed description includes representative examples utilizing numerous features and teachings, both separately and in combination, and describes numerous embodiments in further detail with reference to the attached drawings. This detailed description is merely intended to teach a person of skill in the art further details for practicing preferred aspects of the present teachings and is not intended to limit the scope of the claims. Therefore, combinations of features disclosed in the following detailed description may not be necessary to practice the teachings in the broadest sense, and are instead taught merely to describe particularly representative examples of the present teachings.

Some portions of the detailed descriptions that follow are presented in terms of algorithms and sequences of operations which are performed within a computer memory. These algorithmic descriptions and representations are the means used by those skilled in the data processing arts to most effectively convey the substance of their work to others skilled in the art. An algorithm or sequence of operations is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing," "computing," "calculating," "determining," "displaying" or the like, refer to the action and processes of a computer system, or similar electronic device, that manipulates and transforms data represented as physical (electronic) quantities within the computer system's registers and memories into other data similarly represented as physical quantities within the electronic device's memory or registers or other such information storage, transmission or display devices.

The embodiments disclosed also relate to an apparatus for performing the operations herein. This apparatus may be specially constructed for the required purposes, or it may comprise a general purpose processor selectively activated or reconfigured by a computer program stored in the electronic device. Such a computer program may be stored in a computer readable storage medium, such as, but is not limited to, any type of disk, including floppy disks, optical disks, CD-ROMs, and magnetic-optical disks, read-only memories (ROMs), random access memories (RAMs), EPROMs, EEPROMs, Flash memory, magnetic or optical cards, or any type of media suitable for storing electronic instructions, and each coupled to a computer system bus.

The algorithms presented herein are not inherently related to any particular electronic device or other apparatus. Various general purpose systems may be used with programs in accordance with the teachings herein, or it may prove convenient to construct a more specialized apparatus to perform the required method steps. The required structure for a variety of these systems will appear from the description below. It will be appreciated that a variety of programming languages may be used to implement the teachings of the embodiments as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help understand how the present teachings are practiced, but not intended to limit the dimensions and the shapes shown in the examples.

In the present patent document, methods and systems for automating coaching of a shooter are provided. In such methods and systems, computerized algorithms are used to analyze the shot dispersions of a shooter and predict the cause for any suboptimal performance.

In a preferred embodiment, the embodiments of the present patent document may enhance a small arms training simulator to assist the shooting instructor in quickly discovering the most common shooting mistakes made by trainees. For example, the methods and systems herein may automatically analyze and highlight the most prevalent poor shooting habits. Accordingly, greater training throughput may be achieved because the system may automatically recognize the errors that an instructor would typically have to find.

The embodiments disclosed herein include novel techniques for enabling a computer system to automatically flag potential shooting mistakes. Traditionally, shooting analysis has been entirely the domain of a qualified shooting instructor who observes the shooter's physical interaction (e.g. body position, breathing patterns, sight address), hit results (i.e. where the round(s) hit the target), and environmental factors (e.g. wind, heat, visibility) in order to determine the shooter's mistakes and recommend improvements. Small arms simulators complement an instructor by providing additional data related to the shooter's performance by adding sensors to the weapon to provide details that are difficult to discern by mere observance (e.g. trigger squeeze pressure, weapon cant, butt pressure, aim trace).

In preferred embodiments, shot dispersion data and other sensor data streams are fed into an algorithmic analysis to provide advice to a shooter automatically. Preferably the advice relates to a shooter's mistakes without needing an expert shooting instructor to make the preliminary assessment. In some embodiments, an instructor can use the preliminary analysis to confirm the system's supposition. These systems and methods benefit the instructor since it can speed up the throughput of trainees on the system and reduce the burden on the instructor when training multiple trainees simultaneously. In at least one embodiment, the results are displayed to an instructor via a computer display.

In embodiments where an instructor remains in the loop, the instructor may be unobtrusively alerted. This allows the instructor to focus on trainees having performance issues while minimizing the delay for the other trainees undergoing training.

In a preferred embodiment, machine learning is utilized to suggest diagnoses of shooting mistakes. In some embodiments, only common mistakes may be recognized. However, in other embodiments, more complicated problems may be detected. For example, problems related to complex combinations of problems may be detected.

In some embodiments, the suggestions are communicated directly to the shooter or trainee. This may be done through a screen display or an application ("app") located on a mobile device. In addition to the suggested causes of any suboptimal performance, the trainee may be able to see all the stats about their performance including but not limited to dispersion patterns, sensor responses, number of shots, distance between shots, time between shots and many other statistics.

In other embodiments, the potential causes for suboptimal performance may be communicated to an instructor. The instructor may evaluate the suggestions and/or predictions made by the automated system and then provide advice to a shooter or trainee. In some embodiments, data from multiple trainees or users may be gathered, and displayed to an instructor at a firing range. In other embodiments, both the trainee and the instructor may receive all the feedback available or any appropriate distribution of information based on the trainee instructor relationship.

Figure 1:
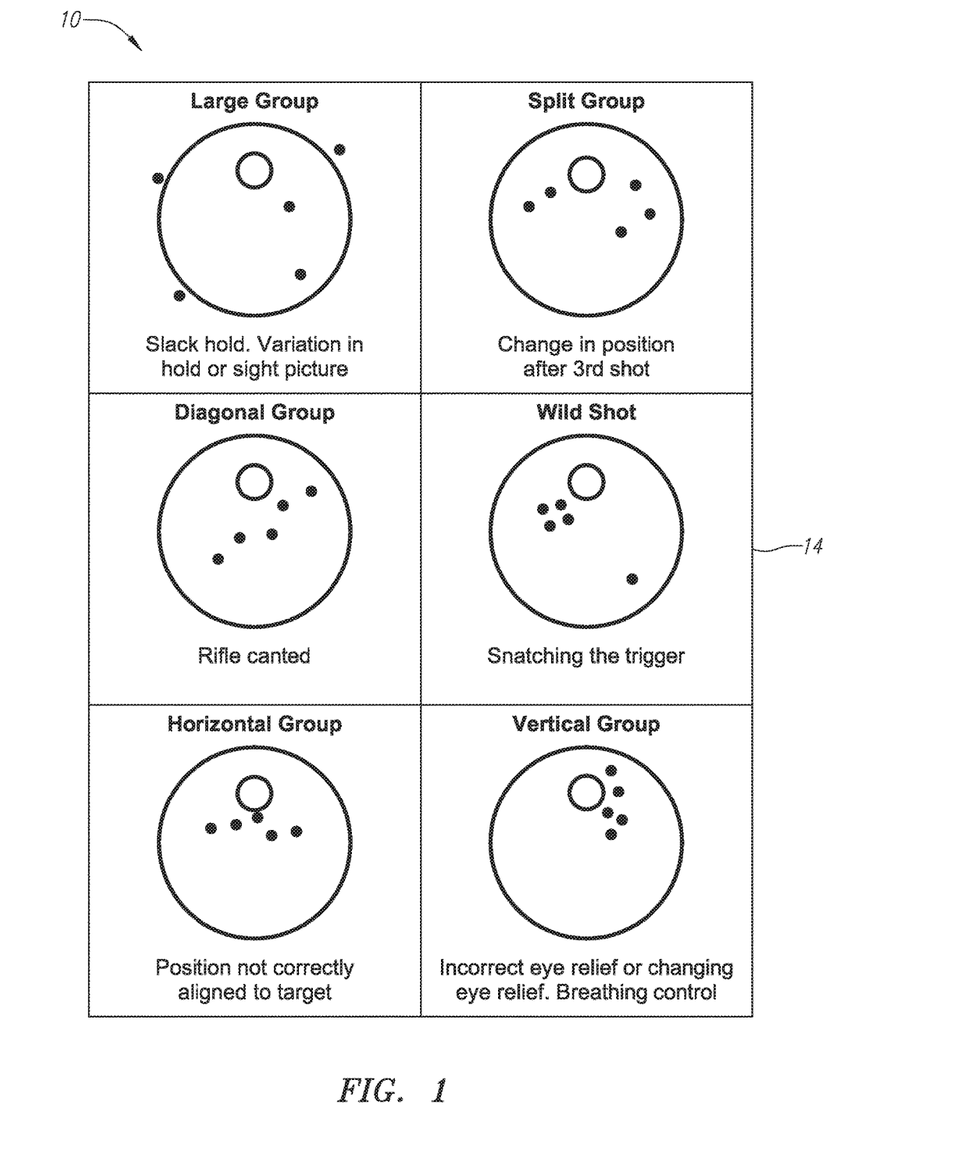
FIG. 1 illustrates reference data of shot dispersions due to common shooting mistakes.

In preferred embodiments the system may make use of previously stored shot patterns and shot dispersion patterns and their related causes to help make a prediction of a trainee's problems. FIG. 1 illustrates examples of shot dispersion patterns and their associated cause 14. In preferred embodiments, systems may include entire databases 10 of shot patterns and or dispersion patterns and their associated causes 14.

The data used to analyze the shooter or trainee may be gathered prior to a training exercise and/or in real time. The data may also be typical data related to all shooters or may be custom data specifically related to the trainee in question.

Figure 2:
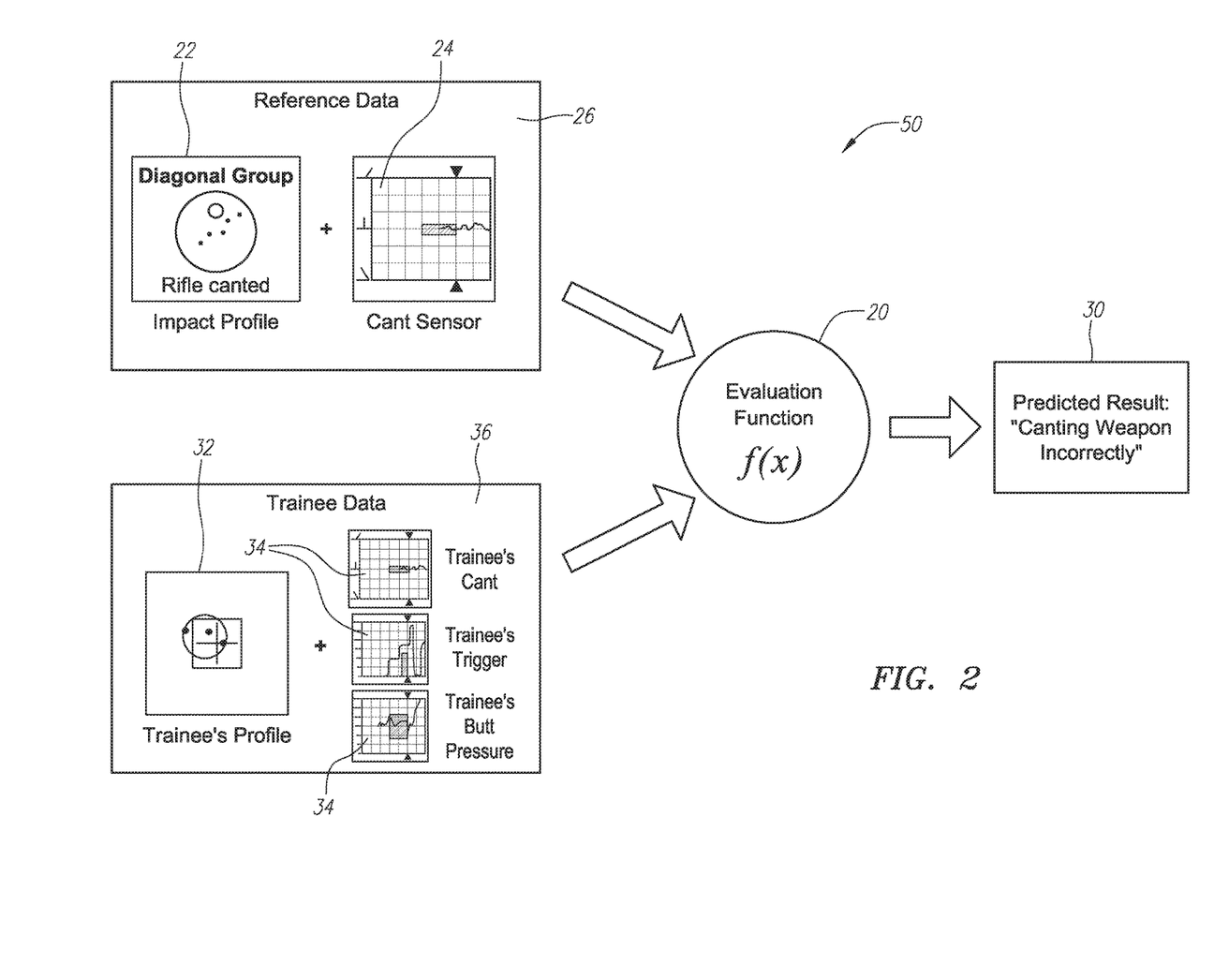
FIG. 2 illustrates a graphical representation of a method for automated coaching of a shooter.

FIG. 2 illustrates a graphical representation of a method for automated coaching of a shooter 50. As may be seen in FIG. 2, both reference data 26 and trainee data 36 may be fed into an algorithm 20 to produce a suggested cause of suboptimal performance 30.

In a preferred embodiment, the reference data 26 is gathered as a set of training examples based on either doctrinal reference material or from expert shooting instructors. In other embodiments, reference data 26 can be gathered from other reference material or other types of instructors, such as the internet, surveys, or compiled over time. In some embodiments, this reference data 26 can include both the shot dispersion data 22 (e.g. where the bullets impacted the target) as well as biometric and weapon sensor data 24 if available. In preferred embodiments, for each type of collected data, their may be corresponding reference data 26 in a database for query.

In a preferred embodiment, the reference data 26 may be used to determine a classification for the trainee data. For example, the reference data may be used to classify the trainee data into any number of sub-optimal performance results like bad aim, bad breathing or other mistakes.

In addition to dispersion data 22, the reference data 26 may include sensor data 24. Weapon sensor data 24 may include but is not limited to breathing data, weapon point of aim trace, weapon cant, weapon trigger pull sensor data, weapon butt pressure sensor data.

As the trainee or shooter practices, trainee data 36 is collected. Similar to the reference data 26, trainee data may be made up of both dispersion data 32 and weapon sensor data 34. One or more of these data points may be compared to the reference data 26 in order to determine a cause of suboptimal performance.

In some embodiments, cameras may be focused on the targets to obtain a trainee's shot dispersion data 32 in real time. An image analysis program may be used to locate the shots and determine locations of each and distances between shots and distances from each shot to the aimed at target.

An evaluation function 20 is used to compare the trainee data 36 with the reference data 26. In some embodiments, each entry of reference data (termed an input vector) is paired with a desired output value (termed a supervisory signal). Accordingly, an algorithm 20 may analyze the reference data 26 in order to create an inferred function known as a classifier or regression function (depending upon the type of data). In some embodiments, this algorithm 20 essentially generalizes from the reference data 26 in order to reasonably handle similar (but not necessarily exact) data in order to make appropriate predictions 30. In some embodiments, the data may be stored on a computer and in particular, in a database. The algorithm may also be run on a computer.

In some embodiments, the algorithm 20 may use machine learning to allow the predictions 30 to become more accurate over time. Machine learning is a branch of artificial intelligence, primarily focused on how machines analyze and learn from data. By separating the problem into data representations (the sample training data 36) and then generalizing based on the reference data 26 (to allow for new data that was not gathered), evaluation functions are created that can then return reasonable inferred predictions of the output solution.

In embodiments that employ learning including machine learning, supervised learning, which is a specific type of machine learning may be employed. In supervised learning, the shooting instructors may rely on significant historical data to determine a likely diagnosis of the trainee's shooting issues and the machine may learn from this prediction. In some embodiments, the shooting instructor may confirm or deny a predicted cause of suboptimal shooting such that the algorithm learns over time.

In other embodiments, other techniques may be used to detect shooting mistakes. For example, evaluation function 20 may use pattern matching. A shooter's pattern or grouping or common misses may be associated with a problem based on a database of known problems that yield such a result. In yet other embodiments, evaluation function 20 may use other techniques such as statistical analysis or similar methods may be used.

In some embodiments, the evaluation function 20 uses the reference data 26 to "train" the classifier resulting in associated relative weighting values being applied to the internal algorithm parameters. These "weights" allow the classifier to adequately classify the reference data 26 and, subsequently, are used to correctly classify the trainee data 36. This may be thought of as an Artificial Neural Network. In some embodiments, the evaluation function 20 can be a linear function (also known as linear predictor function) where weights are assigned to each possible category of classification (based on the reference data 26) and then used (via a dot product) to combine with a particular instance (i.e. trainee data 36) in order to be classified. In some embodiments, a linear function known as Kernel Discriminant Analysis (KDA) may be used. In particular, KDA may be used in conjunction with trigger squeeze data to classify any sub-optimal performance.

The weights are derived through a process whereby successive iterations of refinement are performed using instances of reference data 26 to calculate an error value as part of training the evaluation function 20. The error value is derived from the difference between the desired response (e.g. a known "Good" or "Bad") of the evaluation function 20 and the actual response. The error value is then back-propagated through the algorithm's internal structure and used for successive iterations until the error is below a given threshold. Once this is achieved, the evaluation function 20 is sufficiently "trained" and the weights can then be used to classify trainee data 36.

Figure 3:
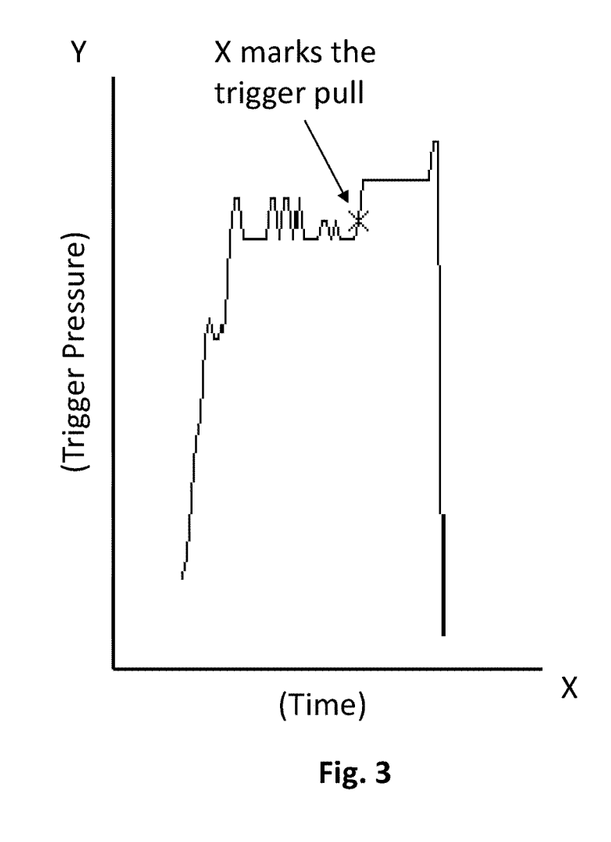
FIG. 3 illustrates a trigger squeeze graph showing an optimal sensor reading (aka "Good trigger").
Figure 4:
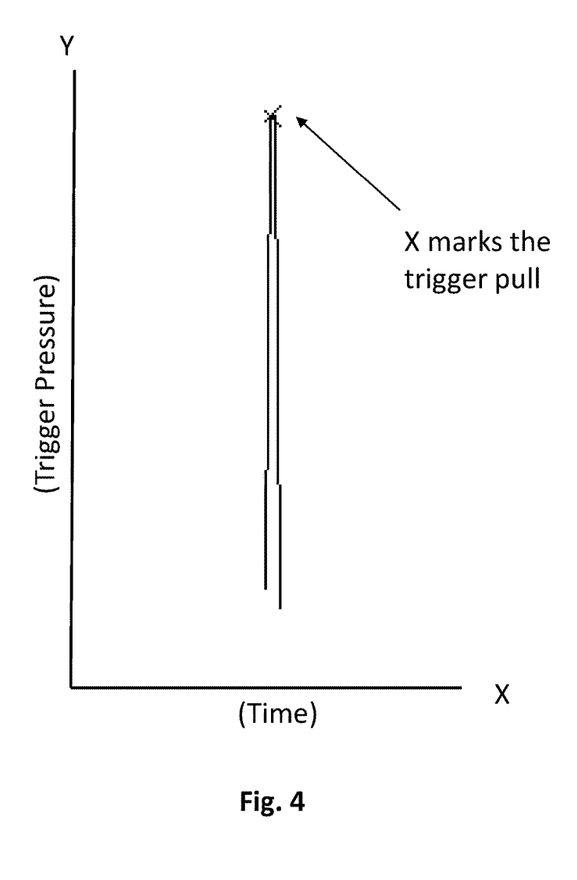
FIG. 4 illustrates a trigger squeeze graph showing a suboptimal sensor reading (aka "Bad (Jerked) trigger").
Figure 5:
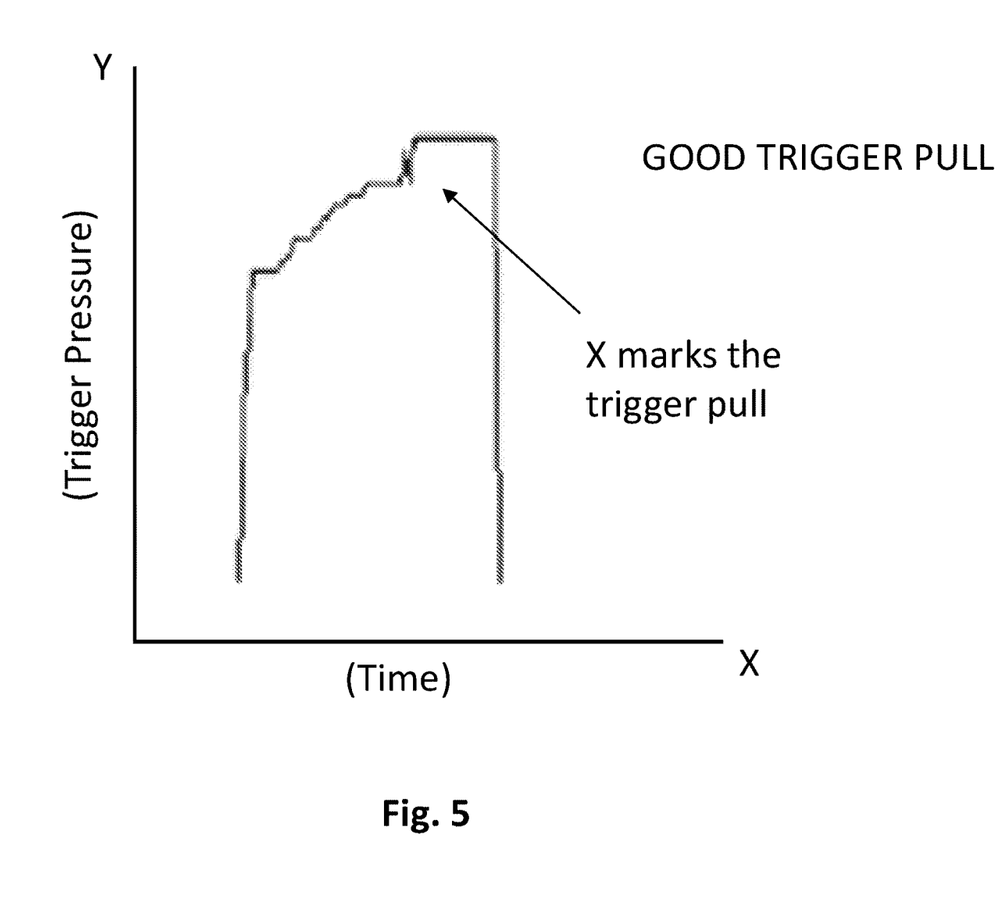
FIG. 5 illustrates a trainee trigger squeeze being classified as "Good."

FIGS. 3 and 4 each show a representative trigger squeeze sensor feed. FIG. 3 illustrates a "good" trigger squeeze while FIG. 4 illustrates a "bad" trigger squeeze. In preferred embodiments, the evaluation function 20 may be fed a number of "good" and "bad" trigger feeds along with the their respective classifications as "good" and "bad" to train the algorithm what a "good" feed looks like. Numerous data samples may be used. Once trained, the evaluation function 20 can correctly classify the trigger squeeze sensor shown in FIG. 5 as "Good", which would be available for presentation to the instructor on a display.

Figure 6:
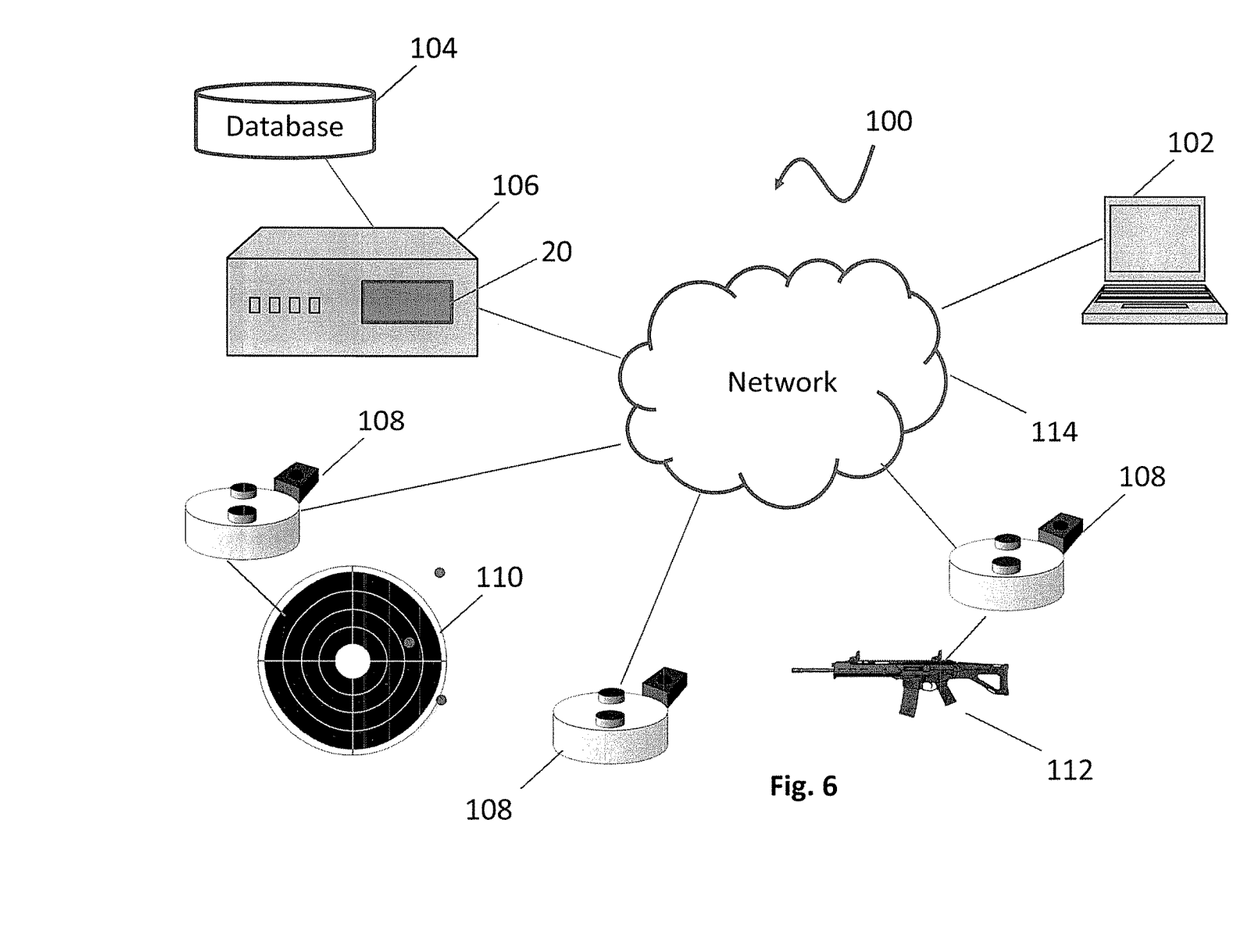
FIG. 6 illustrates one embodiment of a system for automated coaching of a shooter.

As may be seen in FIG. 6, in one aspect of the present patent document an automated coaching system 100 is provided. In some embodiments, the system comprises: at least one sensor 108 for obtaining training data of a trainee's shooting habits; a computer 106 containing an algorithm that evaluates the training data; a display 102 for displaying to an instructor at least one trainee's at least one mistake. In some embodiments, the system provides suggested corrections to fix the trainee's mistake.

As may be seen in FIG. 6, sensors 108 may be located and sensing a plurality of different items. Sensors may be located on a trainee's weapon 112, on the trainee themselves, on the target 110 or any other place that's desirable to acquire data. All of the various components of the system 100 may be connected via a network 114. The network may be wired or wireless. A display 102 may be provided to the shooting coach and/or trainee to provide feedback about performance and potential correctable errors the trainee is making. A computer 106 runs a software program that includes an evaluation function 20 that classifies the input from the various sensors 108 into shooting errors made by the trainee. In preferred embodiments, the evaluation function uses a database 104 to compare the sensor outputs 108 with reference data. By comparing the trainee data against reference data, the evaluation function 20 provide automated feedback to a shooter and/or coach about potential shooting errors that are occurring.

In one aspect of the present patent document, an electronic coaching method is provided. In preferred embodiments, the method comprises: obtaining training data of a trainee's shooting habits from at least one sensor; performing an evaluation function on a computer that evaluates the training data; displaying to an instructor at least one trainee's at least one mistake. In some embodiments, the method provides suggested corrections to fix the trainee's mistake.

Although the embodiments have been described with reference to preferred configurations and specific examples, it will readily be appreciated by those skilled in the art that many modifications and adaptations of the methods, processes and apparatuses disclosed herein are possible without departure from the spirit and scope of the embodiments as claimed hereinafter. Thus, it is to be clearly understood that this description is made only by way of example and not as a limitation on the scope of the embodiments.

What is claimed is:

1. A method for automatically predicting the cause of suboptimal shooting comprising:
   processing a first reference example of a shot dispersion pattern indicating a particular shooting mistake and a second reference example of data from a sensor mounted on a weapon indicating the particular shooting mistake in an evaluation function as bad example reference data;
   processing a third reference example of a shot dispersion pattern not indicating the particular shooting mistake and a fourth reference example of data from a sensor mounted on a weapon not indicating the particular shooting mistake in the evaluation function as good example reference data;
   calculating a plurality of parameters associated with the first, second, third, and fourth reference examples;
   assigning weights to the plurality of parameters;
   repeating both processing steps and the calculating step and adjusting the weights until the evaluation function can correctly determine whether a combination of a reference example of a shot dispersion pattern and a reference example of data from a sensor mounted on a weapon indicates the particular shooting mistake or does not indicate the particular shooting mistake;
   providing a trainee weapon with at least one sensor mounted on the trainee weapon to a trainee;
   obtaining training data that includes shot dispersion data of the trainee and data from the at least one sensor mounted on the trainee weapon;
   using the evaluation function to classify the training data as indicating the particular shooting mistake or not indicating the particular shooting mistake; and,
   displaying on a screen whether the particular shooting mistake has occurred.

2. The method of claim 1, wherein the evaluation function is a regression algorithm.

3. The method of claim 1, wherein the shot dispersion data of the trainee is obtained by a camera and the shot dispersion data of the trainee is further determined using image analysis.

4. The method of claim 1, wherein the at least one sensor mounted on the trainee weapon measures any one of the group consisting of trigger squeeze pressure or displacement, weapon cant, butt pressure and aim trace.

5. The method of claim 1, wherein feedback from a plurality of trainees is displayed on a single screen.

6. The method of claim 1, wherein the evaluation function uses Kernel Discriminant Analysis.

7. The method of claim 1, wherein the at least one sensor is a trigger pull sensor.

8. The method of claim 1, wherein the evaluation function uses an Artificial Neural Network.

9. A system for automatically predicting the cause of suboptimal shooting comprising:
   a database with a plurality of reference examples for suboptimal shooting mistakes;
   a trainee weapon for a trainee;
   at least one sensor mounted to the trainee weapon;
   a display including a screen;
   a computer with software that when executed by a processor performs the following steps:
   processing from the database a first reference example of a shot dispersion pattern indicating a particular suboptimal shooting mistake and a second reference example of data from a sensor mounted on a weapon indicating the particular suboptimal shooting mistake in an evaluation function as bad example reference data;
   processing from the database a third reference example of a shot dispersion pattern not indicating the particular suboptimal-shooting mistake and a fourth reference example of data from a sensor mounted on a weapon not indicating the particular suboptimal shooting mistake in the evaluation function as good example reference data;
   calculating a plurality of parameters associated with the first, second, third, and fourth reference examples;
   assigning weights to the plurality of parameters;
   repeating both processing steps and the calculating step and adjusting the weights until the evaluation function can correctly determine whether a combination of a reference example of a shot dispersion pattern and a reference example of data from a sensor mounted on a weapon indicates the particular suboptimal shooting mistake or does not indicate the particular suboptimal shooting mistake;

obtaining training data that includes shot dispersion data of the trainee and data from the at least one sensor mounted on the trainee weapon;

classifying the training data using the evaluation function as indicating the particular suboptimal shooting mistake or not indicating the particular suboptimal shooting mistake; and, displaying on the screen when the particular suboptimal shooting mistake has occurred.

10. The system of claim 9, wherein the software includes a regression algorithm.

11. The system of claim 9, wherein the shot dispersion data of the trainee is obtained by a camera.

12. The system of claim 11, wherein the shot dispersion data of the trainee is further determined using image analysis.

13. The system of claim 9, wherein the at least one sensor mounted on the trainee weapon includes anyone of the group consisting of trigger squeeze sensor, weapon cant sensor, butt pressure sensor and aim trace sensor.

14. The system of claim 9, wherein feedback for a plurality of trainees is displayed on a single screen.

15. The system of claim 9, wherein the evaluation function uses Kernel Discriminant Analysis.

16. The system of claim 9, wherein the at least one sensor mounted on the trainee weapon is a trigger pull sensor.

17. The system of claim 9, wherein the evaluation function uses an Artificial Neural Network.

18. The method of claim 1 further comprising wherein the evaluation function calculates an error value based on a difference between a desired response of the evaluation function and an actual response of the evaluation function and the repeating step continues until the error value is below a threshold.

19. The method of claim 1 further comprising confirming or denying a predicted cause of suboptimal shooting by the evaluation function with a shooting instructor.

20. The method of claim 1, wherein the bad example reference data and the good example reference data further include biometric reference data.

\* \* \* \* \*